April 14, 1942.  H. E. SIPE  2,279,956
SHAFTING CONNECTION
Filed June 20, 1941
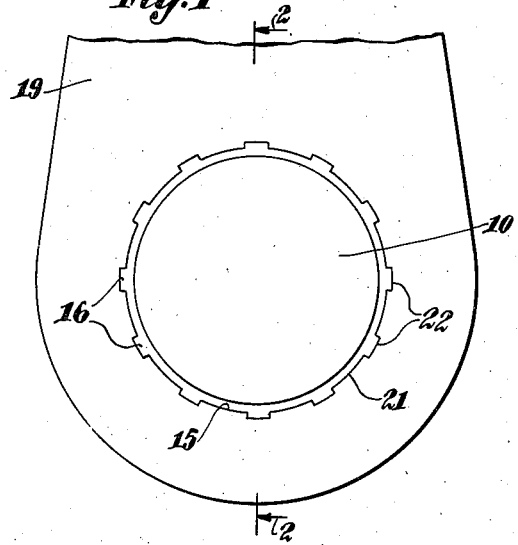
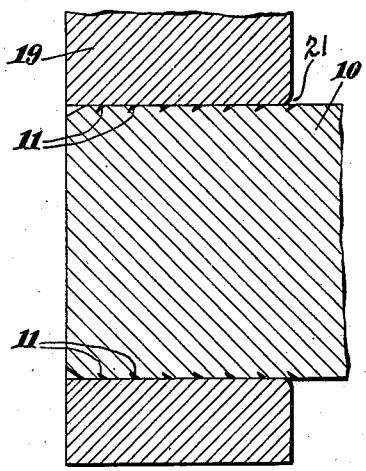
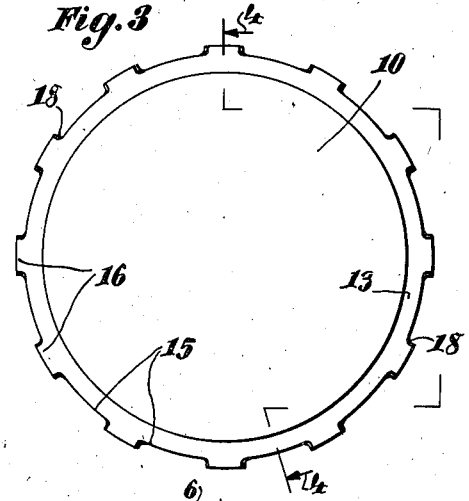
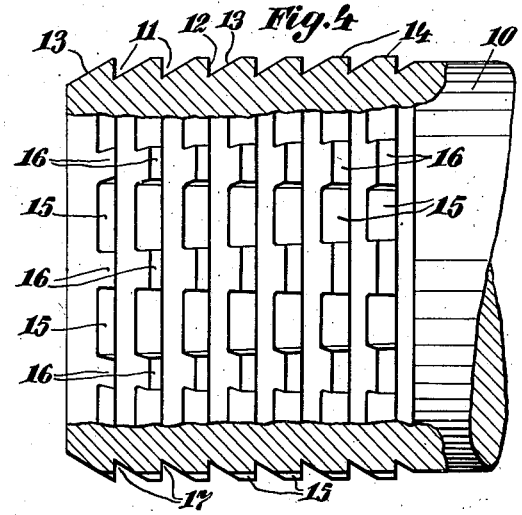
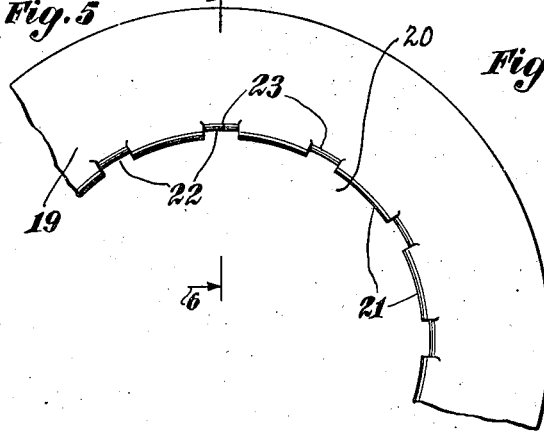
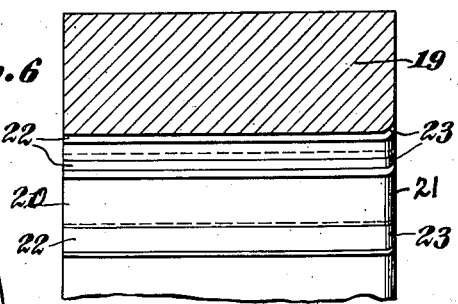
INVENTOR.
Harry E. Sipe,
BY
ATTORNEY.

Patented Apr. 14, 1942

2,279,956

UNITED STATES PATENT OFFICE 2,279,956

SHAFTING CONNECTION

Harry E. Sipe, New York, N. Y.

Application June 20, 1941, Serial No. 398,909

8 Claims. (Cl. 287—53)

The invention here disclosed relates to shafting connections, particularly such for large crank shafts of Diesel engines and the heavy shafting used in ships.

An important object of the invention is to provide an assembled crank shaft, which can be made up and assembled without the use of jigs and other expensive preparation, a result highly desirable because of the fact that these large units are not made up in sufficient numbers to warrant expensive preparation for assembly.

Another object is to provide related parts which can be assembled, as in the case of crank arms or throws in any desired angular relationship.

A further object is to effect a positive keying of the engaged parts without the necessity of great pressure in assembling.

Further objects are to accomplish savings in expense in relation to comparable methods now in use; to avoid the need for the very fine measurements such as now required to attain a shrunk fit in present large size crank shafts; to provide a crank shaft structure which can be made up from regular stock shapes of material; to assemble the members under compression and in so doing, to impress key members on the shaft in three different directions simultaneously during engagement of the parts, thus to take up initial resilience of the metal and obtain a complete filling of the keyways and a positive engagement against torsional stress; and to form keys under the greatest compression at the points immediately adjacent to the bearing portions of the shaft, thus to leave the shortest possible length of shaft subject to torsional strength.

Other desirable objects and the novel features of invention by which all purposes of the invention are attained will appear as the specification proceeds.

The drawing accompanying and forming part of the following specification illustrates certain preferred embodiments of the invention. Structure may be modified and changed however, all within the true spirit and broad scope of the invention, as will appear from the following description and the breadth of the claims.

Fig. 1 is an end elevation of a shaft and crank arm connected according to this invention, the arm shown as broken away.

Fig. 2 is a central sectional view as on substantially the plane of line 2—2 of Fig. 1.

Figs. 3 and 4 are enlarged end and side elevations, the latter view broken and appearing partly in section as on line 4—4 of Fig. 3.

Fig. 5 is an enlarged broken end elevation of the crank member of the combination and Fig. 6 is a sectional view of the same on line 6—6 of Fig. 5.

Figs. 3 and 4 show how the shaft member 10, is circumferentially grooved at 11, with the groove nearest the end of the shaft of the greatest depth and the others, in succession of lesser depth, thus to leave a greater amount of material between each pair of succeeding grooves, inward away from the end of the shaft.

These grooves are shown as formed with abrupt forward sides 12, substantially rectangular to the axis of the shaft and forwardly inclined rearward sides 13, providing a series of bevelled or inclined tapers or annular ridges of successively lesser depth and extent inward from the end of the shaft. The first taper is shown meeting the rectangular wall of the first groove in a sharp ridge and the succeeding tapers are shown as having successively wider substantally cylindrical outer faces or plinths 14.

The annularly ridged portion of the shaft is shown as slotted longitudinally at 15, on inwardly tapering lines, thus to divide the ridges into rows of key segments 16, of gradually increasing width or circumferential extent.

The longitudinal grooves are shown as cut down to less than the full depth of the annular grooves, thus to leave spaces or clearances 17, at the backs of the segments 16, which may receive metal flattened down from the tops of the segments as they are formed into keys under pressure of seating in the other member.

The corners of the longitudinal slots are preferably rounded as indicated at 18.

The inclined faced key segments, by increase in both width and depth of body inward from the end of the shaft, build up greater compression as the shaft is pressed into engagement with the other member and at the same time, compensate for loss of compression that might be ocassioned by abrasion.

The crank arm 19 of the other member with which the shaft is to be engaged is formed with a socket 20, having a rounded edge 21, Fig. 6, at the entrance end to prevent shearing or undue abrasion of the shaft surface.

Keyways 22, are formed in the hole or socket, shown as of a width approximating that of the narrowest key segments at the end of the shaft. These also are shown as having rounded entrance edges 23.

In the combination shown, the shaft is constructed with twelve equally spaced rows of tapered key segments and the shaft bore with twelve equally spaced keyways of equal width throughout their longitudinal extent.

This arrangement permits engagement of the parts in any one of twelve different positions, without the need of a jig, the parts being guided wholly by the rows of key segments fitting in the keyways. The key rows and keyways being 30° apart enables any relationship which is a multiple of 30° to be had, thus enabling assembly of a crank shaft with cranks extending in as many different directions as may be required.

A lubricant is used when the parts are engaged which will prevent or reduce abrasion and cause the engaging surfaces to slide across one another and to compress the keys and meeting faces of the shaft, after the manner indicated in Figs. 1 and 2.

By way of example, a large size crank shaft may have an overall diameter approximately .03" greater than the largest diameter of the bore taken to the bottom of the opposite keyways. The keys at the entering end may be the same width as the key slots and increase in width to a maximum of .02" wider. This will cause the keys to be compressed in three different directions, thus to take up all initial resilience in the metal and effect a strong positive engagement against relative torsional movement. The surface of the shaft between the key segments being .02" greater in diameter than the bore surfaces against which it is pressed, causes the entire surface of the shaft to be compressed except for those portions of the circumferential grooves which may not be completely filled in by the flow of metal under compression.

While particularly adapted to the construction of heavy assembled crank shafts, it will be evident that the invention is adapted to many other structures where a shaft member is to be connected with any other member, such as a rotor of any sort, a cam or any other member which is to be subjected to torsional loads. Other uses are for turbines, pumps, impellers and for securing rings and couplings on shafting and for directly connecting two shaft ends together. In a special form of the invention, the inner raceway of an anti-friction bearing is formed integrally with a shaft section and this shaft section is constructed at one or both ends with the compressive keying elements herein disclosed, so that it may be combined with a mating element by the press fit form of connection or connections illustrated and described.

What is claimed is:

1. A press fit shaft connection, comprising a shaft member and a member having a bore to receive said shaft member, said shaft member having a longitudinal row of key segments of successively greater width inward from the end of the shaft and said other member having a longitudinal keyway in the bore of the same to compressively receive said row of key segments.

2. A press fit shaft connection, comprising a shaft member and a member having a bore to receive said shaft member, said shaft member having a longitudinal row of key segments of successively greater width inward from the end of the shaft, said other member having a longitudinal keyway in the bore of the same to compressively receive said row of key segments, said key segments having taper faces of successively less depth and extent inward from the shaft end.

3. A press fit shaft connection, comprising a shaft member and a member having a bore to receive said shaft member, said shaft member having a longitudinal row of key segments of successively greater width inward from the end of the shaft, said other member having a longitudinal keyway in the bore of the same to compressively receive said row of key segments, said keyway having substantially parallel side walls spaced approximately the width of the narrowest key segment at the end of the shaft.

4. A shaft connection, comprising in combination a shaft member and a member having a bore to receive said shaft member with a press fit, said shaft member having longitudinally extending rows of key segments gradually wider inward from the end of the shaft and said other member having keyways in the bore of the same to compressively receive said rows of key segments.

5. In combination, a shaft member having longitudinal rows of key segments of successively greater width and shallower depth inward from the end of the shaft and a member having a bore to compressively receive said shaft member.

6. A shafting connection, comprising companion longitudinally telescopically engageable members, one formed to seat in the other with a press fit, one of said members having a longitudinal succession of annular key segments separated by longitudinal grooves forming said segments into longitudinal rows and the other member having engaging longitudinal keyway forming faces dimensioned to receive and to compress said rows of separated annular segments into longitudinally extending keys interlocked in drive fit engagement in said keyway forming faces.

7. A pressed connection, comprising telescoping bodies, the contacting surfaces of which are formed with alternate longitudinal ridges and grooves, the ridges of each body matching the grooves of the other body and the contacting surface of one of the bodies being transversely grooved to form flow spaces for the displaced metal as it is compressed during the engagement.

8. In a pressed connection, the combination of telescopically connectible bodies engageable by a press fit, inclined compressible raised segments on the engaging surface of one of the bodies arranged in longitudinal rows and matching grooves of lesser dimensions in the other body adapted to compressively receive and to reduce said segments thereinto.

HARRY E. SIPE.